March 4, 1969  T. J. GUNNELL  3,431,075
PRODUCTION OF CARBON BLACK
Filed Dec. 23, 1966  Sheet 1 of 2
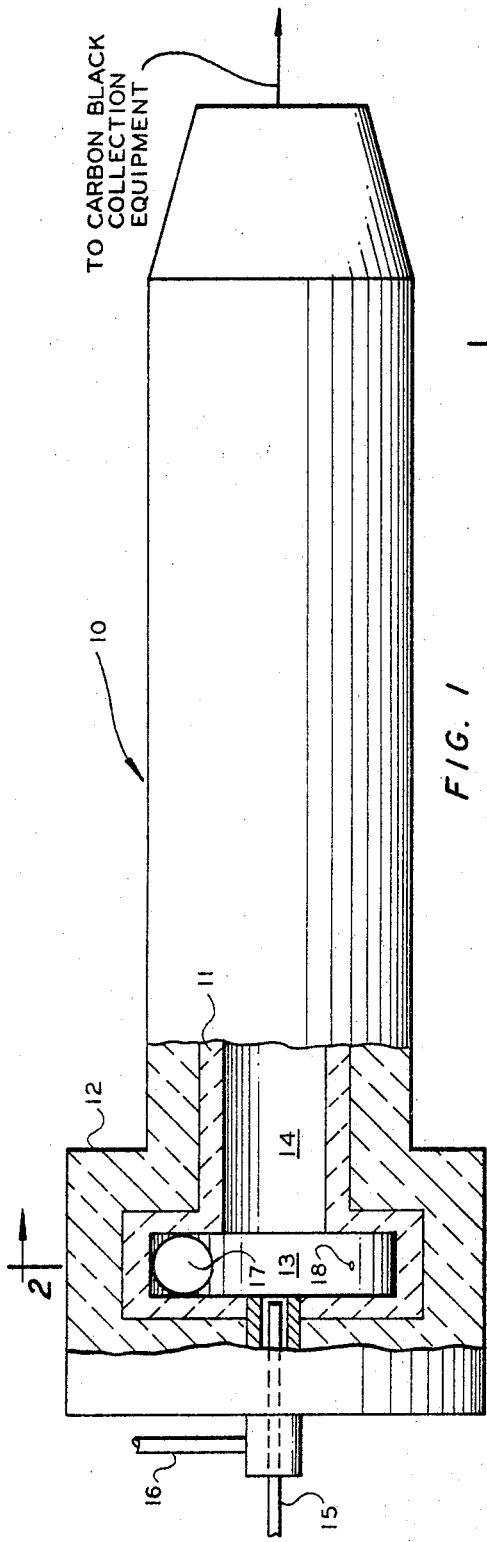
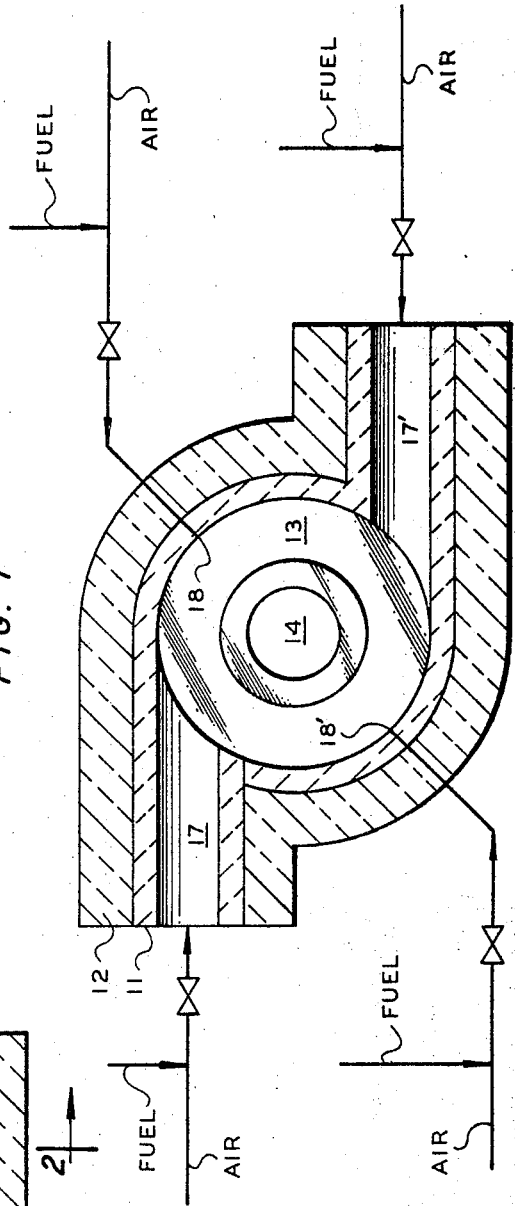
INVENTOR.
T. J. GUNNELL
BY
ATTORNEYS

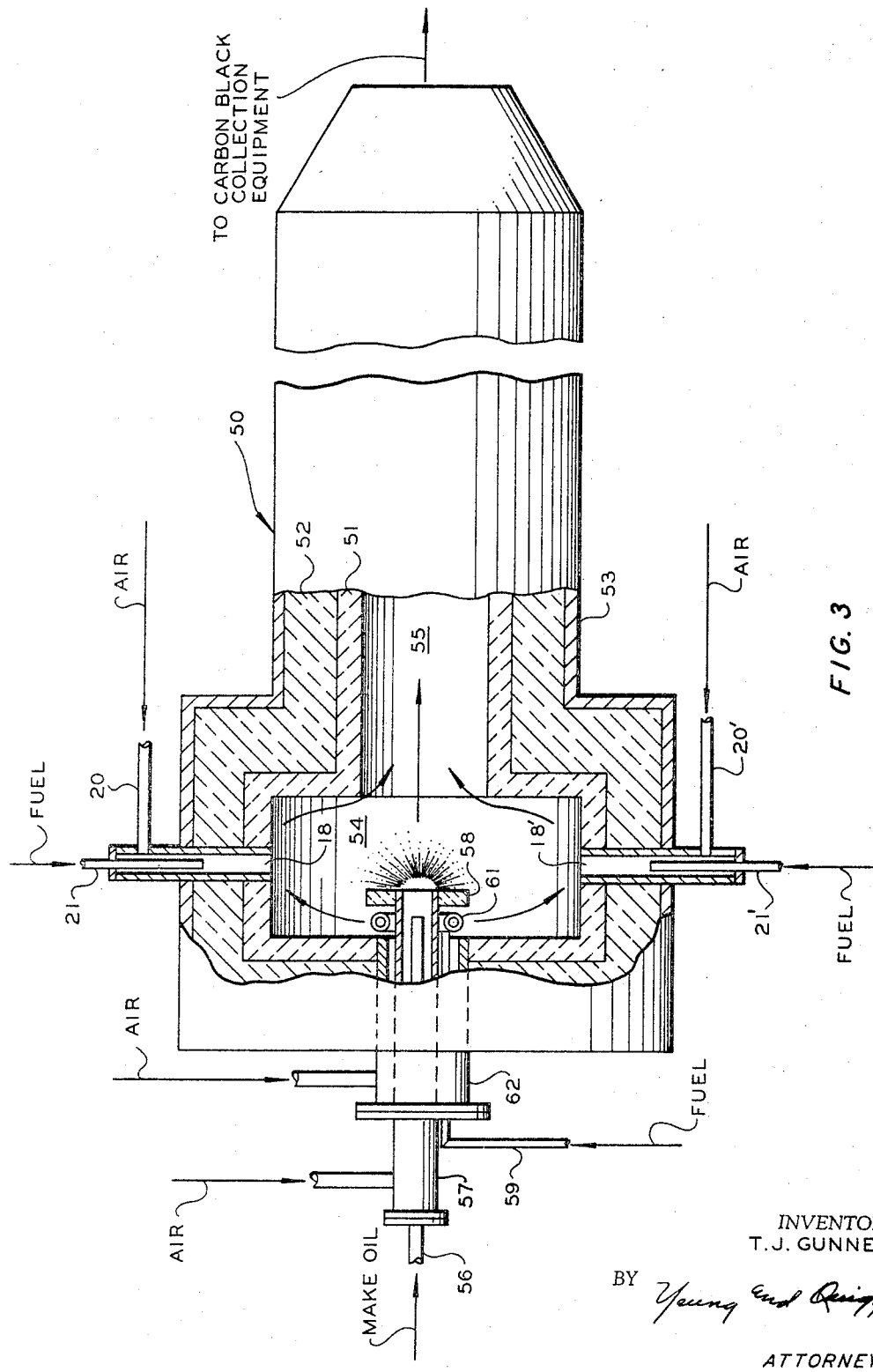

United States Patent Office 3,431,075
Patented Mar. 4, 1969

3,431,075
PRODUCTION OF CARBON BLACK
Thomas J. Gunnell, Bartlesville, Okla., assignor to Phillips Petroleum Company, a corporation of Delaware
Filed Dec. 23, 1966, Ser. No. 604,262
U.S. Cl. 23—209.4            9 Claims
Int. Cl. C09c 1/50

This invention relates to the production of carbon black.

For several years carbon black has been produced in large quantities in furnaces. In one particularly outstanding successful process, a furnace is employed which comprises a generally cylindrical first section or zone having a diameter greater than its length. Said first section or zone is axially aligned with and in open communication with a second section or zone having a length greater than its diameter and a diameter less than the diameter of said first section. A fuel and an oxidant in combustible proportions are introduced into at least one tunnel combustion zone which communicates with said first zone. Combustion of said fuel and said oxidant is substantially completed in said tunnel and the resulting hot combustion gases are introduced into said first zone. A hydrocarbon feedstock is introduced along the longitudinal axis of said first zone and while surrounded by a moving blanket of said hot combustion gases passes into said axially aligned second zone. Carbon black is formed in said first and second sections or zones by the decomposition of said feedstock and recovered from the gaseous effluent from said second section or zone.

When the combustible mixture which is burned to supply said hot combustion gases is essentially a stoichiometric mixture, the heat release obtained approaches the maximum and the resulting temperatures are excessive for most commercially available refractory materials. Thus, a common practice in the operation of such furnaces as described above in accordance with the prior art is to burn a combustible mixture in said tunnel inlet zones which contain an excess of oxidant, e.g., air.

It is desirable for economic reasons to obtain the maximum yield of carbon black. I have now discovered that the yield of carbon black can be increased by operating in a manner to supply to said first zone at least one stream of hot combustion gases obtained by burning a combustible mixture of a hydrocarbon fuel and an oxidant which contains less than the stoichiometric amount of oxidant required for the burning of said fuel, and supplying to said first zone at least one other stream of hot combustion gases obtained by burning a combustible mixture of a hydrocarbon fuel and an oxidant containing an amount of oxidant which is greater than the stoichiometric amount required for the burning of said fuel. For purposes of discussion herein, these operating conditions are referred to as "unbalanced stoichiometric conditions." In contrast, when the combustible mixture burned is the same for the one stream as for the other stream, the stoichiometry is referred to as "balanced stoichiometric conditions."

An object of this invention is to provide an improved process for the production of carbon black. Another object of this invention is to provide an improved process for producing furnace carbon blacks in increased yield. Another object of this invention is to provide a process for producing an increased yield of a furnace carbon black from a hydrocarbon feedstock without subjecting the refractories of the carbon black furnace to excessive temperatures. Other aspects, objects, and advantages of the invention will be apparent to those skilled in the art in view of this disclosure.

Thus, in accordance with the invention, there is provided, in a process for producing carbon black wherein, a plurality of streams of hot combustion gases resulting from the combustion of like combustible mixtures of a hydrocarbon fuel and an oxidant are introduced into a generally cylindrical first zone having a diameter greater than its length, a hydrocarbon feedstock is introduced along the longitudinal axis of said first zone, said feedstock surrounded by a moving blanket of hot combustion gases passes into an axially generally cylindrical second zone having a length greater than its diameter, and carbon black product is removed from the gaseous effluent from said second zone, the improvement comprising: producing at least one of said streams of hot combustion gases by burning a combustible mixture of a hydrocarbon fuel and an oxidant containing an amount of oxidant which is less than the stoichometric amount required for the burning of said fuel; and producing at least one other of said streams of hot combustion gases by burning a combustible mixture of a hydrocarbon fuel and an oxidant containing an amount of oxidant which is greater than the stoichiometric amount required for the burning of said fuel.

In the practice of the invention the only requirements on proportions of fuel and oxidant which can be burned to produce said streams of hot combustion gases which are introduced into said first zone are that at least one of the combustible mixtures which is burned must contain less than the stoichiometric amount of oxidant and at least one other combustible mixture which is burned must contain more than the stoichiometric amount of said oxidant, and that said proportions be such that stable combustion conditions are obtained. It is presently preferred that the combustible mixture (or mixtures) which contains less than the stoichiometric amount of oxidant will contain from about 65 to about 85 percent of oxidant, and that said combustible mixture (or mixtures) which contains more than the stoichiometric amount of oxidant will contain from about 125 to about 190 percent of oxidant. It presently appears that optimum results are obtained in the practice of the invention when at least one of said combustible mixtures contains about 75 percent of the stoichiometric amount of oxidant and at least one other of said combustible mixtures contains about 150 percent of the stoichiometric amount of oxidant so as to give an overall amount of oxidant which is about 100 percent of stoichiometric.

A number of advantages are obtained in the practice of the invention. Included among these advantages is the increase in yield of carbon black, as mentioned above. Another advantage is the protection of the refractories of the furnace from excessive temperatures, as mentioned above. The invention makes it possible to control the temperatures in the inlet tunnels to said furnace zone, and also in said first zone, by regulating the proportions of fuel and oxidant used to produce the hot combustion gases which are introduced into said first zone. If desired, the oxidant, e.g., air, can be preheated. This permits more efficient operations over a broader stoichiometric range than can otherwise be employed.

While it is not intended to limit the invention by any theory of operation, it is presently believed that in operating with unbalanced stoichiometric conditions in accordance with the invention as described above, a new burning and heat release zone is created. This new zone is located within said first zone downstream from the points of introduction of the hot combustion gases and adjacent the axial path of the hydrocarbon feedstock through said first zone. Said new burning and heat release zone is created when the hot combustion gases containing excess fuel contact the hot combustion gases containing excess oxidant, resulting in the combustion of said excess fuel. It is presently believed that the creation of this new burning and heat release zone results in a shift of the zone of maximum temperature from within the upstream portion of said second zone to a point within said first zone. The invention thus makes possible the obtaining of more of the heat required in the process from the fuel rather than from the more expensive hydrocarbon feedstock or make oil.

The oxidant most commonly used in the practice of the invention is air. Air is commonly preferred for convenience. However, other free oxygen-containing gases can also be used. Thus, the oxidant or free oxygen-containing gas can be air enriched with oxygen, essentially pure oxygen, or mixtures of oxygen with other gases. For convenience, the invention will be further described herein in terms of using air as the oxidant or free oxygen-containing gas. However, it is to be understood that the invention is not limited to the use of air.

The fuel used in forming the combustible mixtures burned to produce the hot combustion gases introduced into said first zone can be any suitable fuel, either liquid, solid, or gaseous. Generally speaking, a gaseous fuel such as natural gas or other normally gaseous hydrocarbons is preferred. Liquid hydrocarbon fuels are the next most preferred fuel.

FIGURE 1 is a view, partly in cross section, of one presently preferred type of furnace which can be employed in the practice of the invention.

FIGURE 2 is a cross section taken along the line 2—2 of FIGURE 1.

FIGURE 3 is a view, partly in cross section, of another type of furnace which can be employed in the practice of the invention.

Referring now to the drawings, wherein like reference numerals are employed to denote like elements, the invention will be more fully explained. FIGURES 1 and 2 illustrate one presently preferred furnace 10 comprising a refractory, such as ceramic, lining 11 encased in an insulating shell 12. A metal shell (not shown in FIGURE 1) usually encases the entire furnace assembly. The ceramic lining is shaped to form first section or zone 13 and second section or zone 14. Said second section or zone 14 is axially aligned with and is smaller in diameter than said first section 13, and its length is greater than its diameter. The length of said first section 13 is less than its diameter. An axially disposed inlet conduit 15 is positioned in the end wall of first section 13 as shown. If desired, a spray nozzle can be positioned on the downstream end of conduit 15 to spray conversion or "make" oil into chamber 13. If the "make" hydrocarbon or feedstock is vaporous, the downstream end of conduit 15 is usually open.

Surrounding said feed conduit 15 is a larger conduit which provides an annular space surrounding said feed conduit. A small amount of air is passed via conduit 16 into said annular space. This "jacket air" is not essential. Only sufficient air is used to prevent possible carbon deposition on the outlet of conduit 15 and/or protect said conduits from possible excessive temperatures in section 13.

Said section 13 is provided with tangential inlet tunnels 17 and 17' which are usually two in number, although more than two can be employed. If desired, said first section 13 can also be provided with radial inlets 18 and 18' in addition to or instead of said tangential inlets 17 and 17'. Said radial inlets 18 and 18' can be structurally similar to said tangential inlets 17 and 17', but are here shown schematically so as to simplify the drawings. Said radial inlets can be more than two in number if desired. It is also within the scope of the invention to employ one tangential inlet and one radial inlet, if desired.

In carrying out one presently preferred embodiment of the invention, a combustible mixture of a fuel and air is introduced into each of the tangential inlet tunnels 17 and 17' which communicate tangentially with first zone 13. Any suitable means can be employed for introducing said combustible mixtures into said inlet tunnels 17 and 17', e.g., that shown in U.S. Patent 2,780,529. The mixture introduced into one of said tunnels, e.g., 17, will contain more than the stoichiometric amount of air necessary for burning the fuel contained in said mixture. The mixture introduced into the other of said inlet tunnels, e.g., 17', will contain less than the stoichiometric amount of air necessary for the burning of the fuel contained therein. Burning of said combustible mixtures is initiated in said tunnels. In tunnel 17 the combustion will be substantially completed. The excess fuel in the mixture introduced in tunnel 17' passes into said first zone 13. The hot combustion gases from said tunnel inlet zones follow a spiral path around said first zone 13 toward the axis thereof. Said hot combustion gases form a blanket surrounding the hydrocarbon feedstock introduced via conduit 15 and said feedstock and decomposition products therefrom, while surrounded by said hot combustion gases, pass into said second zone 14. Carbon black product is recovered from the gaseous effluent from said zone 14 by any suitable means known to the art.

FIGURE 3 illustrates another reactor 50 which can be employed in the practice of the invention. Said reactor 50 comprises a refractory lining 51 encased in an insulating shell 52. A metal shell 53 usually encases the entire reactor assembly. The refractory lining is shaped to form first section or zone 54 and second section or zone 55. Said second section 55 is smaller in diameter than first section 54 and its length is greater than its diameter, as in FIGURE 1. The length of first section 54 is less than its diameter, also as in FIGURE 1. An axial inlet conduit 56 is positioned in the end wall of chamber 54. If desired, a spray nozzle can be positioned on the downstream end of conduit 56 to spray nonvaporous conversion or "make" oil into chamber 54. If desired, axial air can be introduced into the annulus between conduit 56 and conduit 57 to jacket the stream of feedstock exiting the outlet of conduit 56. Secured to the end of conduit 57 and positioned within first section 54 is a circular deflector 58 constructed of refractory material. A fuel inlet conduit 59 is also positioned in the end wall of combustion chamber 54 and has attached to its downstream end a ring member 61 provided with a plurality of ports around its periphery for injecting a disc-shaped spray of fuel toward the circumferential surface of first section 54. A stream of combustion supporting oxidant such as air is introduced through conduit 62 which surrounds fuel conduit 59 and conduit 57 so as to provide a combustible mixture with the fuel exiting the ports of ring 61. Upon ignition of the fuel and oxidant, the combustion gases follow a flow pattern indicated by the arrows around the periphery of first section 54 and into second section 55.

Hydrocarbon fuel can be introduced to the radial inlets 18 and 18' via conduits 21 and 21' and air can be introduced to the inlets 18 and 18' by means of conduits 20 and 20'. Any other suitable means such as that described above in connection with FIGURES 1 and 2 can be employed for introducing said fuel and air into inlets 18 and 18'. In the operation of the furnace of FIGURE 3, the combustible mixture formed in one of said inlets 18 and 18' would contain less than, and the other would contain more than, the stoichiometric amount of air required for the fuel therein.

The following examples will serve to further illustrate the invention.

Example I

A series of runs for the production of carbon black was carried out in a furnace embodying the essential features of the furnace illustrated in FIGURES 1 and 2. In the furnace employed, first section or zone 13 was 15.75 inches in diameter and 4.75 inches in length. Second zone or section 14 was 4 inches in diameter. Inlet tunnels 17 and 17' were 4.5 inches in diameter and had a length of approximately 17 inches along the short side thereof. The above dimensions are given by way of example only, are not limiting on the invention, and any and all can be varied within the scope of the invention. The feedstock used in this series of runs was benzene having, by definition, a Bureau of Mines correlation index value of 100. Operating conditions, yields of carbon black, and tests on the carbon black products are set forth in Table I below.

ried out in accordance with the prior art, shows that the advantages of the invention are also obtained when using this different feedstock, either vaporized or nonvaporized.

TABLE I

| | Run number | | | | | |
|---|---|---|---|---|---|---|
| | 1 | 2 | 3 | 4 | 5 | 6 |
| Feedstock: | | | | | | |
| BMCI [1] | 100 | 100 | 100 | 100 | 100 | 100 |
| Rate, lbs./hr | 75.5 | 60.5 | 61.8 | 62.5 | 24.9 | 76.9 |
| Preheat temp., °F | 482 | 510 | 515 | 502 | 460 | 510 |
| Air rates: | | | | | | |
| Jacket air, s.c.f.h | 179 | 180 | 179 | 179 | 172 | 175 |
| Tang. inlet 17, s.c.f.h | 3,020 | 3,020 | 3,000 | 2,980 | 3,000 | 2,990 |
| Tang. inlet 17', s.c.f.h | 3,020 | 3,020 | 3,000 | 2,980 | 3,000 | 2,990 |
| Tan. inlet 17, percent stoichiometric | 150 | 68 | 85 | 75 | 75 | 126 |
| Tang. inlet 17', percent stoichiometric | 150 | 181 | 126 | 150 | 75 | 182 |
| Overall [2] percent stoichiometric | 150 | 99 | 101 | 100 | 75 | 149 |
| Propane fuel rate: | | | | | | |
| Tang. inlet 17, s.c.f.h | 85 | 189 | 151 | 169 | 168 | 101 |
| Tang. inlet 17', s.c.f.h | 85 | 71 | 101 | 85 | 168 | 70 |
| Carbon black product: | | | | | | |
| Yield, lbs./gal. feed | 3.52 | 4.27 | 4.16 | 4.35 | 3.68 | 3.60 |
| Yield, percent C in feed | 51.8 | 62.8 | 61.0 | 64.2 | 54.0 | 53.7 |
| Yield, percent C in feed+fuel | 42.2 | 44.5 | 43.3 | 45.5 | 23.0 | 43.9 |
| Photelometer | 94 | 92 | 92 | 91 | 90 | 93 |
| N₂ surface area, sq. m./g | 84 | 87 | 90 | 87 | 109 | 88 |
| Oil absorption, cc./100 g | 126 | 124 | 119 | 122 | 113 | 129 |

[1] Bureau of Mines Correlation Index.

[2] Overall percent of stoichiometric = $\dfrac{\text{Total tangential air}}{\text{Total propane fuel} \times 23.5} \times 100$ (23.5 cu. ft. of air per cu. ft. of propane is stoichiometric to $CO_2 + H_2O$)

Referring to Table I, Run No. 1 is a control run carried out in accordance with the prior art. Runs 2, 3, and 4 were carried out in accordance with the invention. Comparing said Runs 2, 3, and 4 with Run 1 shows there was obtained an increase in carbon black yield in all of said Runs 2, 3, and 4, and that the greatest increase in yield was obtained in Run No. 4.

Referring to Run No. 5, it will be noted that while a small increase in carbon black yield was obtained when the combustible mixture burned in both of inlet tunnels 17 and 17' was rich in fuel, there was obtained a great decrease in overall yield, i.e., from the hydrocarbon feedstock plus the hydrocarbon fuel. Thus, the process of Runs 5 is much less efficient than the process of Runs 2, 3, and 4. Similarly, referring to Run 6, it will be noted that the increase in yield obtained is much smaller than in Runs 2, 3, and 4. Run 6 shows that an operation wherein all the combustible mixtures used to produce the hot combustion gases contain more than the stoichiometric amount of air is less efficient than the stoichiometrically unbalanced operations of Runs 2, 3, and 4.

Example II

Another series of runs was carried out in the same furnace as used in the runs of Example I. In Runs 7 and 8 of this series the hydrocarbon feedstock was a conventional aromatic concentrate feedstock obtained by the sulfur dioxide extraction of cycle oils obtained in the catalytic cracking of gas oils. Said feedstock had an API gravity of 8.3 and a BMCI value of 100. In said Runs 7 and 8 the feedstock was introduced into the furnace in a substantially vaporized state.

In Runs 9 and 10 of this series of runs, the feedstock was a similar aromatic concentrate oil having an API gravity of 10.5 and a BMCI value of 93. In said Runs 9 and 10, said feedstock was sprayed into the furnace in a substantially nonvaporized state. Operating conditions, yields of carbon black, and tests on the carbon black products are set forth in Table II below. Comparison of Runs 8 and 10, carried out in accordance with the invention, with their respective control Runs 7 and 9, car-

TABLE II

| | Run number | | | |
|---|---|---|---|---|
| | 7 | 8 | 9 | 10 |
| Feedstock: | | | | |
| BMCI [1] | 100 | 100 | 93 | 93 |
| Rate, lbs./hr | 71.0 | 58.3 | 55 | 44 |
| Preheat temp., °F | 750 | 750 | 440 | 400 |
| Air rates: | | | | |
| Jacket air, s.c.f.h | 190 | 190 | 180 | 180 |
| Tang. inlet 17, s.c.f.h | 3,000 | 3,010 | 3,000 | 3,000 |
| Tang. inlet 17', s.c.f.h | 3,000 | 3,010 | 3,000 | 3,000 |
| Tang. inlet 17, percent stoichiometric | 150 | 75 | 150 | 75 |
| Tang. inlet 17', percent stoichiometric | 150 | 150 | 150 | 150 |
| Overall [2], percent stoichiometric | 150 | 100 | 150 | 100 |
| Propane fuel rate: | | | | |
| Tang. inlet 17, s.c.f.h | 85 | 169 | 85 | 170 |
| Tang. inlet 17', s.c.f.h | 85 | 85 | 85 | 85 |
| Carbon black product: | | | | |
| Yield, lbs./gal. feed | 4.3 | 5.1 | 3.4 | 4.4 |
| Yield, percent C in feed | 57.7 | 67.1 | 45.7 | 59.1 |
| Yield, percent C in feed+fuel | 46.1 | 46.0 | 34.5 | 36.9 |
| Photelometer | 90 | 90 | 93 | 91 |
| N₂ surface area, sq. m./g | 89 | 94 | 93 | 93 |
| Oil absorption, cc./100 g | 141 | 139 | 129 | 115 |

[1] Same as in Table I.
[2] Same as in Table I.

The above-described aromatic concentrate oils of the example represent one presently preferred feedstock for use in the practice of the invention. However, conventional aromatic oils used in the production of furnace carbon blacks can include oils other than extract oils produced by liquid sulfur dioxide extraction of cycle oils. Typical properties of conventional aromatic oils are: boiling range, 400–1000° F.; BMCI, 75 to 150; and an API gravity of from about 0 to about 20°.

The invention is not to be limited to the use of aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane, or the like. Broadly, most any hydrocarbon can be used as feed in my process. However, the normally liquid hydrocarbons are preferred, and the normally liquid aromatic hydocarbons are more preferred, because of the higher yields obtained therefrom. The feed can be injected as a liquid through a spray or atomizer, or the feed can be injected as a vapor. Hydrocarbons from other sources than petroleum likewise are suitable, as for example, low temperature coal gas, coal tar distillates, shale gases and distillates can be used. These feedstocks may contain most any class of hydrocarbon compound, as for example, saturated or unsaturated hydrocarbons, paraffins, olefins, aromatics, naphthenes, or any others which might become available.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In a process for producing carbon black wherein, a plurality of streams of hot combustion gases resulting from the combustion of like combustible mixtures of a hydrocarbon fuel and an oxidant are introduced into a generally cylindrical first zone having a diameter greater than its length, a hydrocarbon feedstock is introduced along the longitudinal axis of said first zone, said feedstock surrounded by a moving blanket of hot combustion gases passes into an axially aligned generally cylindrical second zone having a length greater than its diameter, and carbon black product is recovered from the gaseous effluent from said second zone, the improvement comprising: producing at least one of said streams of hot combustion gases by burning a combustible mixture of a hydrocarbon fuel and an oxidant containing an amount of oxidant which is less than the stoichiometric amount required for the burning of said fuel; and producing at least one other of said streams of hot combustion gases by burning a combustible mixture of a hydrocarbon fuel and an oxidant containing an amount of oxidant which is greater than the stoichiometric amount required for the burning of said fuel.

2. A process according to claim 1 wherein at least two of said streams of hot combustion gases are each produced in an individual tunnel combustion zone communicating with said generally cylindrical first zone.

3. A process according to claim 2 wherein said streams of hot combustion gases are produced in tunnel combustion zones which communicate tangentially with said generally cylindrical first zone.

4. A process according to claim 3 wherein said streams of hot combustion gases are two in number and each is produced in a separate tunnel combustion zone.

5. A process according to claim 4 wherein one of said streams of hot combustion gases is produced by burning a combustible mixture of a hydrocarbon fuel and an oxidant containing an amount of oxidant which is within the range of from 65 to 85 percent of the stoichiometric amount required for the burning of said fuel; and the other of said streams of hot combustion gases is produced by burning a combustible mixture of a hydrocarbon fuel and an oxidant containing an amount of oxidant which is within the range of from 125 to 190 percent of the stoichiometric amount required for the burning of said fuel.

6. A process according to claim 5 wherein said oxidant is air.

7. A process according to claim 6 wherein said hydrocarbon fuel is a vaporous fuel.

8. A process according to claim 7 wherein said hydrocarbon fuel is a normally gaseous fuel.

9. A process according to claim 8 wherein one of said streams of hot combustion gases is produced by burning a combustible mixture containing about 75 percent of the stoichiometric amount of air and the other stream of hot combustion gases is produced by burning a combustible mixture containing about 150 percent of the stoichiometric amount of air.

References Cited

UNITED STATES PATENTS

| 2,781,250 | 2/1957 | Miller | 23—259.5 |
| 2,961,300 | 11/1960 | Dollinger | 23—209.4 |
| 3,009,784 | 11/1961 | Krejci | 23—209.4 |
| 3,051,556 | 8/1962 | Whitsel | 23—259.5 |
| 3,175,888 | 3/1965 | Krejci | 23—259.5 |

EDWARD J. MEROS, *Primary Examiner.*